Patented Aug. 13, 1929.

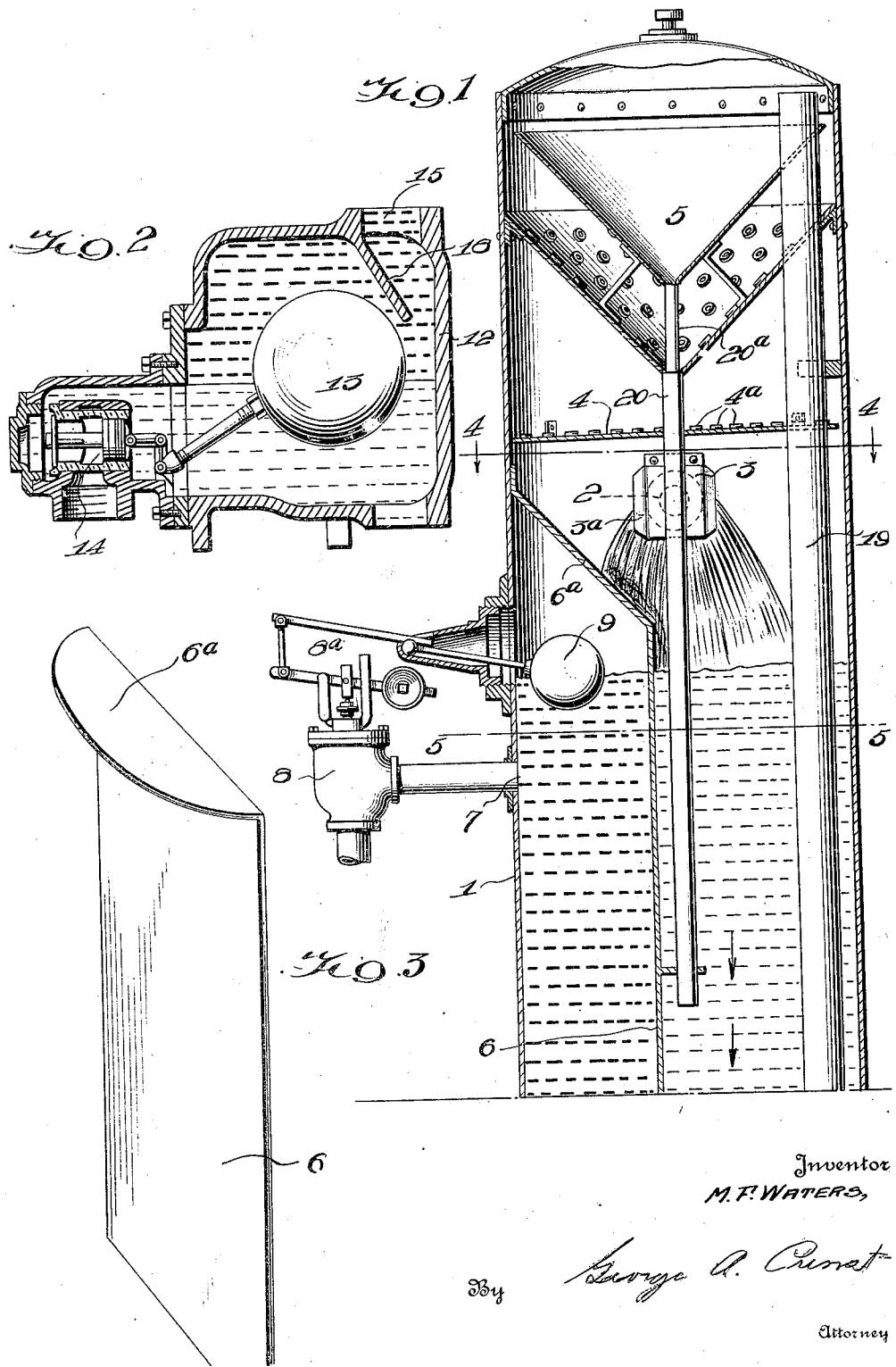

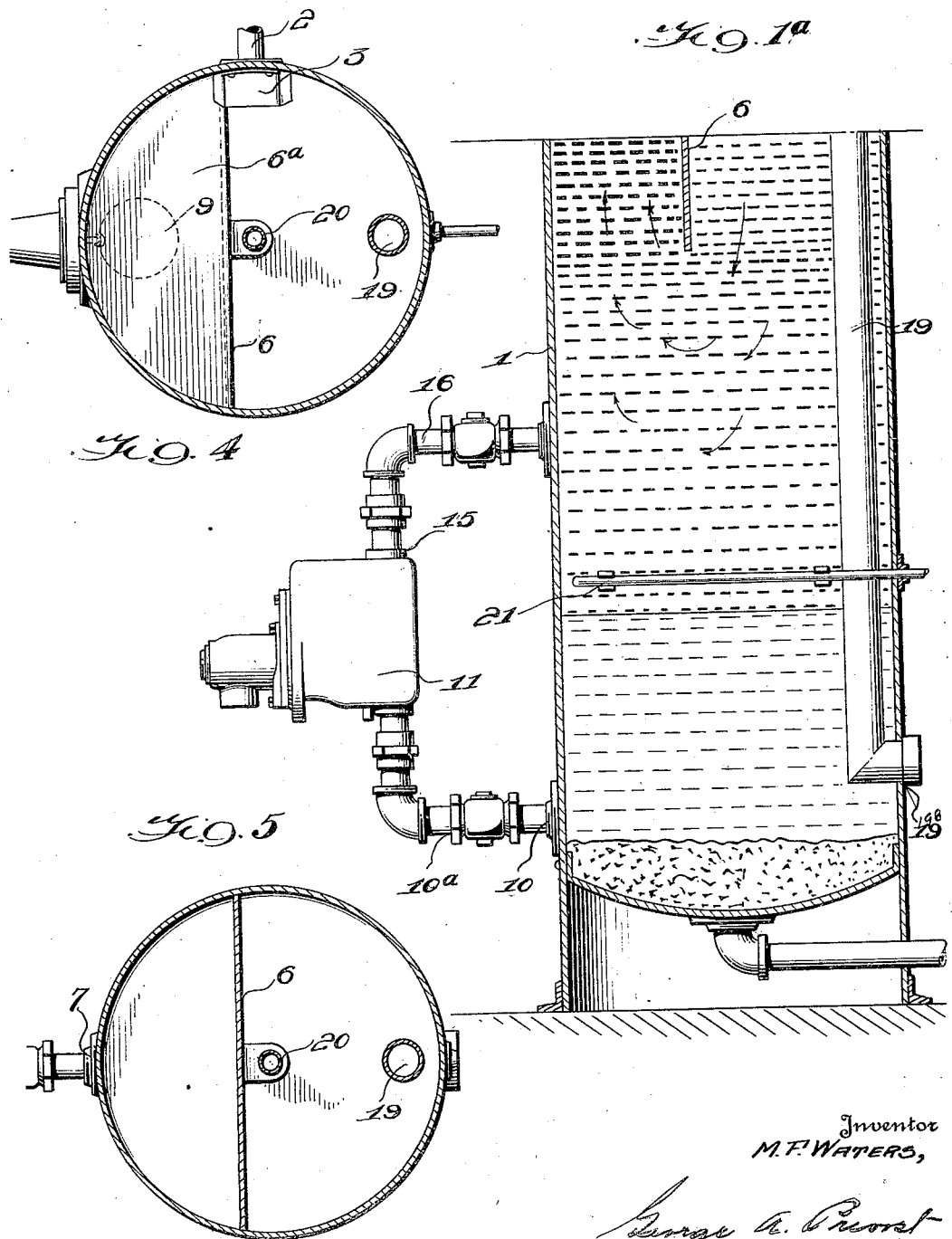

1,724,537

UNITED STATES PATENT OFFICE.

MILLARD F. WATERS, OF TULSA, OKLAHOMA, ASSIGNOR TO SMITH SEPARATOR COMPANY, OF TULSA, OKLAHOMA.

SEPARATOR TANK.

Application filed October 13, 1926. Serial No. 141,350.

My invention consists in new and useful improvements in oil and gas separator tanks and the like, and has for one of its objects to provide a device, which, in addition to separating the oil from the gas, will separate water from the mixture and drain the same off automatically.

Another object of my invention is to provide a separator tank equipped with steam coils which are adapted to maintain the contents of the tank at such a temperature as to facilitate the separation.

A still further object of my invention is to provide an apparatus of the class described which will operate automatically under pressure, without pressure, and under vacuum.

With the above and other objects in view which will appear as the description proceeds, my invention consists in the novel features herein set forth in detail, illustrated in the accompanying drawings, and more particularly pointed out in the appended claims.

Referring to the drawings, in which numerals of like character designate similar parts throughout the several views:

Fig. 1 is a cross sectional view of the upper half of my improved separator tank showing my particular arrangement of baffles and the automatically controlled oil outlet.

Fig. 1$^a$ is a similar view of the lower half of the apparatus showing the automatic water outlet control in side elevation.

Fig. 2 is a detail in cross section of the water outlet control.

Fig. 3 is a perspective view of the vertical baffle which separates the pure oil from the mixed oil and water.

Fig. 4 is a cross section taken on line 4—4 of Fig. 1.

Fig. 5 is a similar view taken on line 5—5 of Fig. 1.

In the drawings, 1 represents the shell or tank proper which is provided with an oil and gas inlet 2 located in the upper portion of the wall of said tank. Adjacent this inlet 2 on the inner surface of said wall, I provide an angularly disposed baffle 3 welded to the wall at its upper extremity, and projecting inwardly and downwardly, being provided with downwardly bent lips 3$^a$ which extend longitudinally on each side of said baffle. 4 designates a horizontal baffle located slightly above the inlet 2 and comprising a circular disc constructed with raised apertures 4$^a$, the objects of which will be described later. This baffle is slightly spaced apart from the walls of the tank and is arranged in such a manner that one side is lower than the other, in order that any fluid resting upon the upper surface thereof, will be easily drained off. Above this baffle 4, I provide a series of conical baffles 5, identical with those shown and described in my Patent No. 1,511,845, the lower baffle being provided with a plurality of raised apertures, and secured directly to the wall of the tank in any suitable manner, while the upper baffle is solid in construction and secured to, but spaced apart from the lower baffle. This upper baffle is slightly less in diameter than the wall of the tank 1, thereby leaving a circular space between the two, whereby upflowing gases will be allowed to pass around the baffle, into the head of the tank.

6 represents a vertically extending baffle or partition located beneath the horizontal baffle 4, and extending downwardly in said tank for a predetermined distance below the oil outlet 7, being welded or otherwise secured at its edges to the shell of the tank. This baffle is bent at its upper extremity 6$^a$, toward the shell of the tank where it is also welded or otherwise secured to the tank forming a compartment in one side of said tank which will be hereinafter referred to.

The oil outlet 7 is located in the wall of the tank 1 within the compartment formed by the baffle 6, and is provided with an automatic controlling valve 8, actuated by a series of levers 8$^a$ operated by a float 9 which extends within the tank and is located in the upper portion of said compartment and enclosed therein. 19 represents a gas outlet conduit open at its upper end and extending vertically from the upper portion of the tank 1, through the baffles 5 and 4, to a point near the bottom of the tank, where it forms an L and projects outwardly through the shell of the tank as at 19$^a$. 20 designates a drain pipe secured to the apex of the lower conical baffle 5 extending downwardly through the horizontal baffle 4 to a predetermined point below the oil level. 20$^a$ is a similar drain pipe secured to the apex of the upper conical baffle 5 which extends downwardly within the mouth of the drain pipe 20, In the lower portion of the tank 1, I provide a water outlet 10 which is connected by pipes 10$^a$ to a control 11 which comprises a float cage 12, a float 13 adapted to float in water and sink in oil, and a valve 14, actuated thereby. In the upper portion of the float cage 12, over the float 13, is located an aperture 15, which is connected into the shell of the tank by the pipes 16 thereby equalizing the pressure in the control 11. In order to prevent the incoming oil from having a surging effect on the float 13, I provide an inwardly and downwardly extending baffle 18, adjacent the aperture 15, and over a portion of the float 13.

At a point in the lower portion of the tank 1, substantially in line with the water outlet control 11 which regulates the height of the water in the bottom of the tank, I provide a steam coil 21 which maintains the contents of the tank at the desired temperature to facilitate the separation of the oil, water and gas.

The operation of my apparatus is as follows:

The gas, oil and water enter the separator tank through the inlet 2, and immediately come in contact with the inclined baffle 3, which, due to the downwardly extending lips, deflects all the liquid downwardly, allowing the gases to rise. The rising gas comes in contact with the horizontal baffle 4 which deflects any heavy hydrocarbons which may be carried thereby, downwardly, and the gas continues its upward passage through the apertures 4$^a$, in said baffle, coming in contact with the lower conical baffle 5 which is also provided with apertures through which the gas is allowed to pass. This baffle further separates any liquids which might still be retained by the gas and deflects the same downwardly on the horizontal baffle 4, which, as before described, being angularly disposed in the tank, causes said liquid to drain toward the lower side from whence it flows by gravity, down the inner wall of the tank. The raised portions of the apertures 4$^a$ prevent the liquid from passing back through said apertures and cause it to flow around the same, where it is drained off, as before stated.

After passing through the lower baffle 5, the gas comes in contact with the under surface of the upper conical baffle, the upper edges of which are spaced apart from the walls of the tank 1. This allows the gas to pass around the edges of said baffle and into the top of the shell from whence it escapes downwardly through the gas outlet conduit 19, and is carried off in any suitable manner, any remaining liquids having been knocked back by the upper baffle 5, on to the upper surface of the lower baffle from which it is carried back to the bottom of the tank by the drain pipe 20. Any particles of liquid which may still be retained by the gas after having passed through these several baffles, is knocked back by the head of the tank on to the upper surface of the upper conical baffle, from whence it is drained back to the bottom of the tank through pipes 20$^a$ and 20.

The liquid having been deflected downwardly as aforesaid, and freed from gas, falls to the bottom of the tank outside of the compartment formed by the partition 6, the bent upper end 6$^a$ of said partition preventing any liquid from entering the compartment from the top, thus protecting the float 9 from any surging effect which might be caused by the incoming oil, water and gas.

To separate the oil and water, it is necessary to give them at least a chance to settle one from the other, and as water will always sink to the bottom, leaving the oil on top, this is accomplished in the lower portion of the tank, in the following manner:

The baffle 6, as heretofore pointed out, is extended to a given length below the oil outlet 7 which causes the oil and water to travel downwardly, as indicated by the arrows on the drawings, giving them a chance to begin separation, the oil naturally going to the top and seeking its level on the side of the baffle and the water sinking to the bottom of the tank. The water in the bottom, enters the lower connection to the automatic water outlet control by means of the outlet 10 and the pipe 10$^a$, and rises in the float cage 11, causing the float to rise, which, when it has reached a predetermined lever, will cause the valve 14 to open and discharge the water until it has returned to its former level.

As before stated, the pressure in this outlet control is equalized by the admission of oil or oil and water, through the pipe 16 from the tank 1. This, in no way, affects the operation of the float 13, as the latter is constructed to float in water and sink in oil as before mentioned, and is protected from displacement by the incoming mixture, due to the inclined baffle 18.

The oil, having been separated from the water, rises upwardly within the compartment formed by the partition 6, and when it has reached the level of the float 9, causes the same to rise and actuate the outlet valve 8 to discharge the oil.

At any time during the operation of the device, steam may be passed through the coils 21 to regulate the temperature of the mixture in the tank. Some oil and water will separate better if heat is employed, and by providing steam coils inside of the separator tank, steam can be applied, and any determined heat that the operator desires, may be had. The heat will naturally travel upward and the contents inside of the separator from the top of the coils to the oil outlet valve, will be kept warm by these steam coils which will assist in breaking down the mixture or emulsion.

From the foregoing, it is believed that my invention may be clearly understood by those skilled in the art without further description, it being borne in mind that numerous changes may be made in the details of the construction without departing from the spirit of the invention as disclosed in the following claim.

What I claim and desire to secure by Letters Patent is:

An oil and gas separator tank comprising an oil and gas inlet, means within said inlet for deflecting incoming liquids downwardly, allowing the gases to rise, a circular perforated disc mounted above said inlet and spaced apart from the walls of said tank, said disc being angularly disposed in said tank, a series of baffles above said disc, a vertically extending partition in said tank below said inlet, forming a compartment, closed at its top and open at its lower extremity, a suitable distance from the bottom of the tank, whereby oil, from which the water has settled, is permitted to rise and is kept apart from the incoming mixed oil and water, an automatically controlled oil outlet in said compartment, and an automatically controlled water outlet in said tank below said compartment.

In testimony whereof I affix my signature.

MILLARD F. WATERS.